United States Patent
Hilde (10) Patent No.: US 9,519,979 B1
(45) Date of Patent: Dec. 13, 2016

(54) LADAR RANGE DATA VIDEO COLOR RENDERING

(71) Applicant: The United States of America, as represented by the Secretary of the Navy, Washington, DC (US)

(72) Inventor: Jeffrey J. Hilde, Onyx, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 96 days.

(21) Appl. No.: 14/604,180

(22) Filed: Jan. 23, 2015

(51) Int. Cl.
| | |
|---|---|
| *G06T 11/00* | (2006.01) |
| *G06T 7/00* | (2006.01) |
| *G01B 11/14* | (2006.01) |
| *G06T 7/40* | (2006.01) |

(52) U.S. Cl.
CPC ............. *G06T 11/001* (2013.01); *G01B 11/14* (2013.01); *G06T 7/004* (2013.01); *G06T 7/408* (2013.01)

(58) Field of Classification Search
CPC .................................................... G06T 11/001
See application file for complete search history.

(56) References Cited

U.S. PATENT DOCUMENTS

| | | | | |
|---|---|---|---|---|
| 9,165,383 | B1* | 10/2015 | Mendez-Rodriguez | G06T 11/001 |
| 2006/0054782 | A1* | 3/2006 | Olsen | G02B 3/0062 250/208.1 |
| 2014/0163885 | A1* | 6/2014 | Clar | G01C 15/00 702/5 |
| 2014/0297068 | A1* | 10/2014 | Revell | G06K 9/00637 701/16 |
| 2015/0009214 | A1* | 1/2015 | Lee | G06T 7/0046 345/420 |

* cited by examiner

*Primary Examiner* — Joni Richer
*Assistant Examiner* — Grace Q Li
(74) *Attorney, Agent, or Firm* — James M. Saunders (57) ABSTRACT

Embodiments of the invention employ a LADAR range data stream, a Cartesian coordinate system that is fixed to the Earth, and a Cartesian coordinate system that is fixed to a LADAR sensor. An index is determined and used to select a color from a color map for each range pixel of LADAR data. The color value is electronically-associated with the pixel.

12 Claims, 5 Drawing Sheets

LADAR RANGE DATA VIDEO COLOR RENDERING

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to LADAR sensor video data.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

Embodiments of the invention generally relate to LADAR sensor video data and, more particularly, to color rendering of range data of LADAR that results in continuous coloring, frame to frame, for a visually enhanced presentation of the data. Embodiments provide a unique solution for the rendering and display of LADAR range data (RELADAR), where continuity of color from frame to frame is preserved even while the LADAR sensor is moving, making embodiments suitable for LADAR video. REDAR is the term given to describe a rendered LADAR video stream. Other coloring methods can cause the coloring to change, frame to frame, as the sensor moves. When LADAR data is rendered for a still picture, this change is unnoticed since only one frame is presented for viewing at a time. But, with the presentation of LADAR data as video, this change is undesirable.

Embodiments of the invention are described and employ: (1) a LADAR range data stream; (2) a Cartesian coordinate system that is fixed to the earth; and (3) a Cartesian coordinate system that is fixed to the sensor, and defines a method to determine the index used to select a color from a color map for each range pixel of the LADAR data. Embodiments use an efficient approximation of the vertical axis of an Earth-fixed coordinate system as the independent variable to the computation of the color map indexing and thus all pixels with approximately the same elevation will be colored the same. This gives the advantage to the visual stability of objects that navigate horizontally such as land and sea vehicles, providing object coloring that is largely constant such as, for example, a car moving around in a parking lot.

Although embodiments of the invention are described in considerable detail, including references to certain versions thereof, other versions are possible. Examples of other versions include performing the tasks in an alternate sequence or hosting embodiments on different platforms. Therefore, the spirit and scope of the appended claims should not be limited to the description of versions included herein.

At the outset, it is helpful to describe various conventions, parameters, and terminology associated with embodiments of the invention.

Earth Fixed Coordinate Frame

Figure 4:
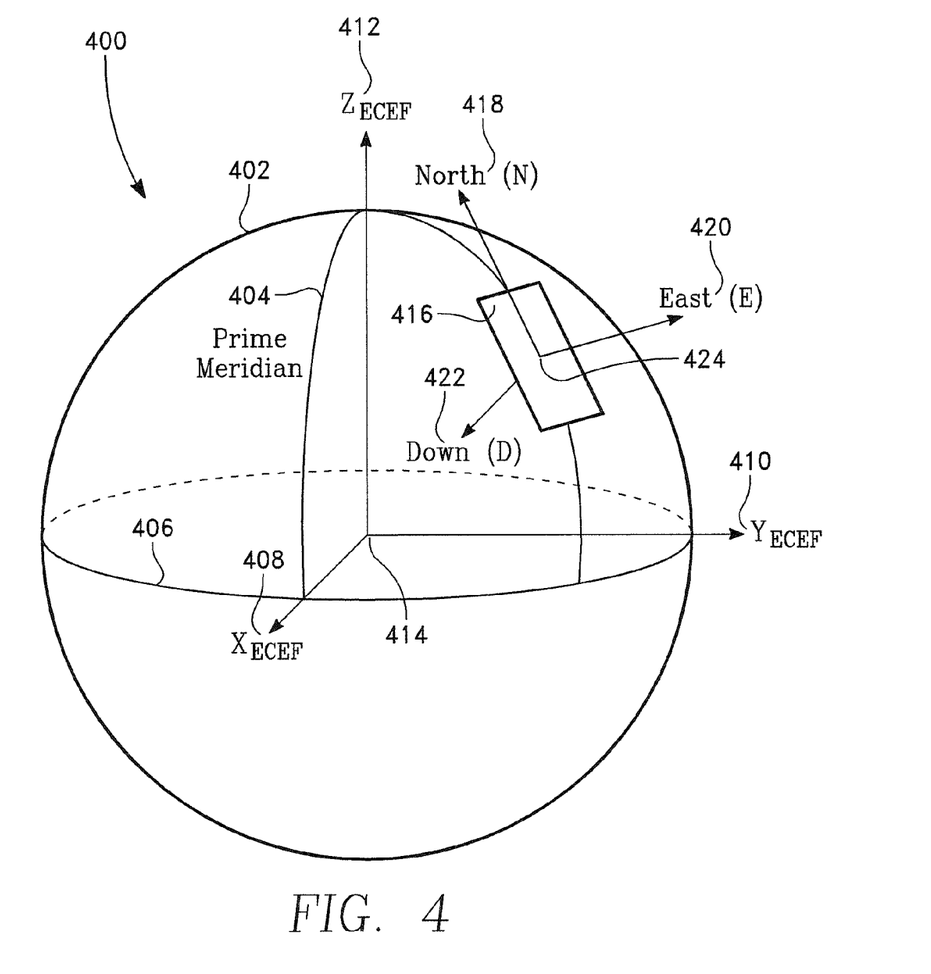
FIG. 4 is an exemplary Earth-fixed coordinate frame, according to some embodiments of the invention.

The term "earth fixed (EF) fixed coordinate frame" is defined as a right-handed three-dimensional Cartesian coordinate system. The origin is fixed to a point near the surface of the earth with the x-axis point north, the y-axis pointing east, and the z-axis pointing down. The x-y plane is parallel with the surface of the earth at the origin FIG. 4 depicts an Earth-fixed coordinate frame, according to some embodiments of the invention.

Sensor Fixed Coordinate Frame

Figure 5A:
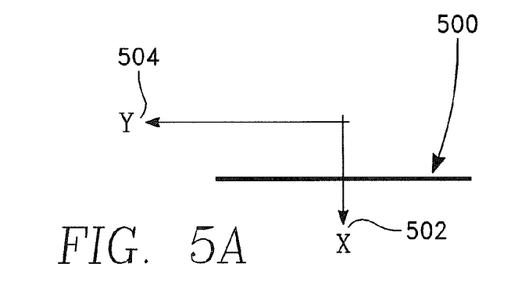
FIGS. 5A, 5B, & 5C depict an exemplary sensor-fixed coordinate frame in top, front, and side views, respectively, according to some embodiments of the invention.
Figure 5B:
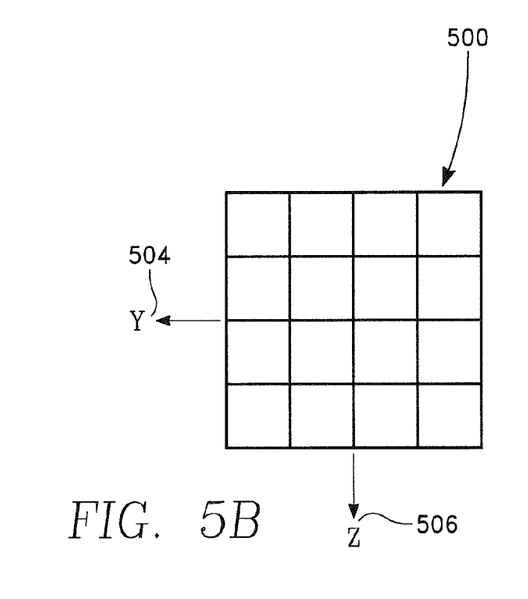
Figure 5C:
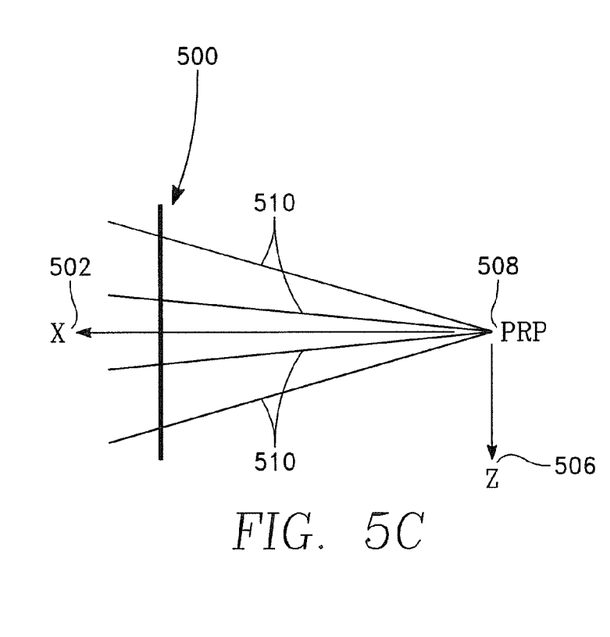

The term "sensor-fixed (SF) coordinate frame" is a right-handed three-dimensional Cartesian coordinate system with origin fixed to the sensor. The x-axis points in the forward looking direction of the sensor. The y-axis is parallel with the sensor pixel rows and the z-axis is parallel with the sensor pixel columns. FIGS. 5A, 5B, & 5C depict a sensor-fixed coordinate frame, according to some embodiments of the invention. Other terminology may be used for the SF coordinate frame array such as, for example, a focal plane array, a sensor focal pane array, or similar terminology.

Range Data

The term "range data" is the row (r) and column (c) range image. For each pixel (r,c), a range ($R_{r,c}$) is the distance from the sensor to a scene for the pixel (r,c).

Position Data

The term "position data" is the position ($P_x$, $P_y$, $P_z$) of the sensor at the time when the Range Data was collected. This position is defined as the position of the Sensor Fixed (SF) coordinate frame with respect to the Earth Fixed (EF) coordinate frame. The position ($P_x=0$, $P_y=0$, $P_z=0$) is the position of the origin of the SF coordinate frame when located at the origin of the EF coordinate frame.

Orientation Data

The term "orientation data" is the rotational matrix of the sensor and is defined as, $$M = \begin{bmatrix} T_{11} & T_{12} & T_{13} \\ T_{21} & T_{22} & T_{23} \\ T_{31} & T_{32} & T_{33} \end{bmatrix}.$$

Similarly, depending on the nomenclature used, $$M = \begin{bmatrix} X \cdot x & Y \cdot x & Z \cdot x \\ X \cdot y & Y \cdot y & Z \cdot y \\ X \cdot z & Y \cdot z & Z \cdot z \end{bmatrix}$$

is also valid. In particular, the Orientation Data is the rotational matrix of the sensor at the time when the Range Data was collected. This orientation is defined with respect to the Earth fixed (EF) coordinate frame. The identity matrix for (T) is defined for the sensor fixed (SF) coordinate frame as an orientation where the x-axis of both the EF and SF coordinate frames are parallel and pointing in the same direction. The y-axis of both the EF and SF coordinate frames are parallel and pointing in the same direction. The z-axis of both the EF and SF coordinate frames are parallel. The first column of the matrix is the x-axis of the SF coordinate frame expressed as a unit vector in EF coordinates. Similarly, the second column of the matrix is the y-axis of the SF coordinate frame and the third column of the matrix is the z-axis of the SF coordinate frame. The elements of the first row of the matrix are the x-axis coordinates for each of the SF coordinate system axes. Similarly, the elements of the second row are the y-axis coordinates and the elements of the third row are the z-axis coordinates.

Direction Vector

The term "Direction Vector" is a vector $(1, D_c, D_r)$ specified for each pixel in the SF coordinates that approximates a unit vector pointing in the look direction of the pixel (r,c) with respect to the look direction of the sensor image center. The unit vector $(1, D_c=0, D_r=0)$ is defined as the look direction for the center of the sensor image and is the x-axis of the SF coordinate system. In particular, $(D_c)$ is the look angle (in the SF y-axis direction, rotation about the SF z-axis) in radians, of the column (c) from the look direction for the center of the sensor image (the SF x-axis) and $(D_r)$ is the look angle (in the SF z-axis direction, rotation about the SF y-axis) in radians, of the row (r) from the look direction for the center of the sensor image (the SF x-axis). The Direction Vectors are a function of the sensor optics and, for constant optics, are constant with time.

Elevation

The term "Elevation" is an approximation of the EF vertical (z-axis) coordinate value for each pixel and is computed as follows: $E_{r,c} = (T_{31} + D_c T_{32} + D_r T_{33}) R_{r,c} + P_z$.

Index

The term "index" $I_{r,c}$ is calculated using the modulo division operator. The index is the remainder of the Elevation scaled by (s) divided by the number of elements (n) in the Color Map and is used to lookup the color value from the color map: $I_{r,c} = (s \cdot E_{r,c})$ modulo n. An algorithm to efficiently compute $(I_{r,c})$ for a color map that has 256 entries where r=50, c=20, and s=25 is as follows:

Float a[20]; float b[50];
for (int c=0; c<20; c++) a[c]=T31+Dc[c]*T32;
for (int r=0; r<50; r++) b[r]=+Dr[r]*T33;
for (int c=0; c<20; c++)
{
  for (int r=0; r<50; r++)
  {
    I[r,c]=(int)(((a[c]+b[r]*R[r,c]+Pz)*25 & 0xFF;
  }
}.

Flash

The term "flash" is the Range Data, the Position Data, and the Orientation Data that are all collected at the same time with the LADAR sensor.

Frame

The term "frame" is a collection of Flashes that fit together to make a continuous image of the scene.

LADAR Video Stream

The term "LADAR video stream" is the time sequence of Frames.

Apparatus/System Embodiments

Figure 1:
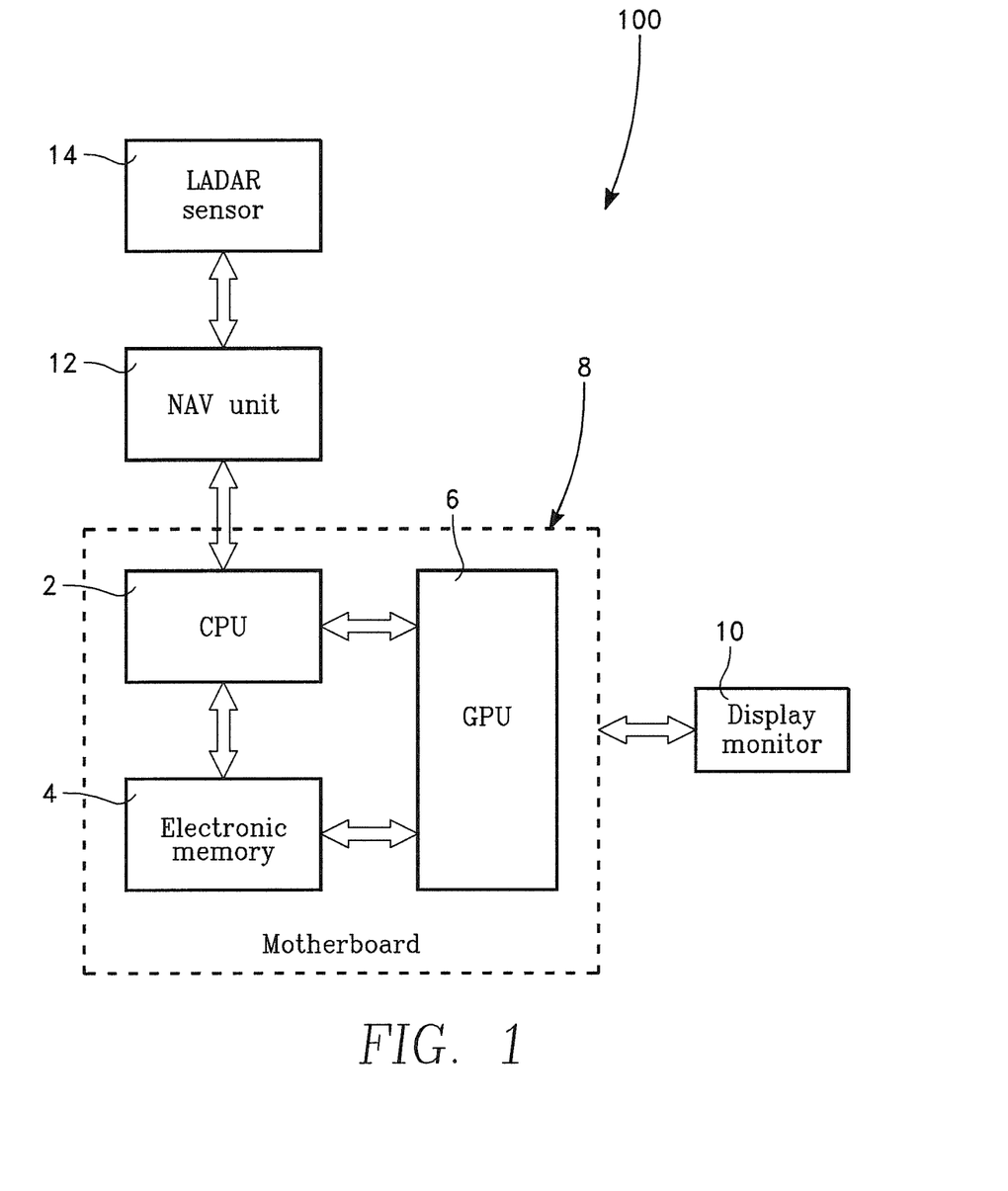
FIG. 1 illustrates components of some systems and/or articles of manufacture, according to some embodiments of the invention.

With reference to FIG. 1, apparatus/system embodiments are collectively shown as reference character 100 and include a Central Processing Unit (CPU) 2 operatively-associated with electronic memory 4 and a graphics processing unit (GPU) 6, operatively-associated with a display monitor 10, to display a visual depiction of output. The central processing unit 2 is the hardware within a computer that carries out the instructions of a computer program by performing the basic arithmetical, logical, and input/output operations of the system. The CPU 2 is operatively associated with memory 4, which includes data and stored instructions. The CPU 2 and memory 4 are both operatively-associated with the GPU 6. The GPU 6, also known as a visual processing unit (VPU), is a specialized electronic circuit constructed to rapidly manipulate and alter memory to accelerate the building of images in a frame buffer intended for output to a display. The memory 4 receives input, and stores software, which the CPU 2 and GPU 6 use to perform the processes described herein.

Reference character 8 designates a motherboard, to which the CPU 2, memory 4, and GPU 6 are electrically-associated. In some applications, depending on the verification requirements, a visual verification by a user is important to provide an additional layer of validation before acting on the processing result. Some embodiments, therefore, include the display monitor 10, which is sometimes referred to as a visual display screen.

Reference character 12 is a navigation unit such as, for example, one associated with an airborne vehicle. The navigation unit 12 is associated with a LADAR sensor 14, configured to receive signals. The navigation unit 12 is configured to communicate with the CPU 2.

Article of Manufacture Embodiments

Article of manufacture embodiments are directed to non-transitory processor readable medium(s) having stored thereon processor executable instructions that, when executed by the processor(s), cause the processor to perform the process(es) described herein. The term non-transitory processor readable medium include one or more non-transitory processor-readable medium (devices, carriers, or media) having stored thereon a plurality of instructions, that, when executed by the electronic processor (typically a central processing unit—an electronic circuit which executes computer programs, containing a processing unit and a control unit), cause the processor to process/manipulate/act on data according to the plurality of instructions (defined herein using the process/function form). The non-transitory medium can be any non-transitory processor readable medium (media), including, for example, a magnetic storage media, "floppy disk", CD-ROM, RAM, a PROM, an EPROM, a FLASH-EPROM, any other memory chip or cartridge, a file server providing access to the programs via a network transmission line, and a holographic unit. Of course, those skilled in the art will recognize that many modifications may be made to this configuration without departing from the scope.

In some apparatus/system embodiments, the electronic processor is co-located with the processor readable medium. In other system embodiments, the electronic processor is remotely located from the processor readable medium. It is noted that the steps/acts/tasks/processes described herein including the figures can be interpreted as representing data structures or sets of instructions for causing the computer readable medium to perform the step/act/process.

Certain embodiments of the invention may take the form of a computer program product on a computer-usable storage medium having computer-usable/readable program instructions embodied in the medium. Any suitable computer readable medium may be utilized including either computer readable storage media, such as, for example, hard disk drives, CD-ROMs, optical storage devices, or magnetic storage devices, or a transmission media, such as, for example, those supporting the internet or intranet.

Computer-usable/readable program instructions for carrying out operations of embodiments of the invention may be written in an object oriented programming language such as, for example, Python, Visual Basic, or C++. However, computer-usable/readable program instructions for carrying out operations of embodiments of the invention may also be written in conventional procedural programming languages, such as, for example, the "C#" programming language or an engineering prototyping language such as, for example, MATLAB®. The computer-usable/readable program instructions may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider or any other method known in the art).

Embodiments of the invention are described in part below with reference to flow chart illustrations and/or block diagrams of methods and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer-readable memory, including RAM, that can direct a computer or other programmable data processing apparatus to function in a particular manner, such that the instructions stored in the computer-readable memory produce an article of manufacture including instructions that implement the function/act specified in the flow chart and/or block diagram block or blocks. The computer program instructions may also be loaded onto a computer or other programmable data processing apparatus to cause a series of operational tasks to be performed on the computer or other programmable apparatus to produce a computer implemented process such that the instructions that execute on the computer or other programmable apparatus provide tasks for implementing the functions/acts specified in the flow chart and/or block diagram block or blocks.

In the accompanying drawings, like reference numbers indicate like elements. FIG. 1 illustrates the components of some systems and/or articles of manufacture, according to embodiments of the invention. Reference character 100 depicts an apparatus of embodiments of the invention. The individual components depicted in FIG. 1 function together to perform the disclosed methods.

Figure 2:
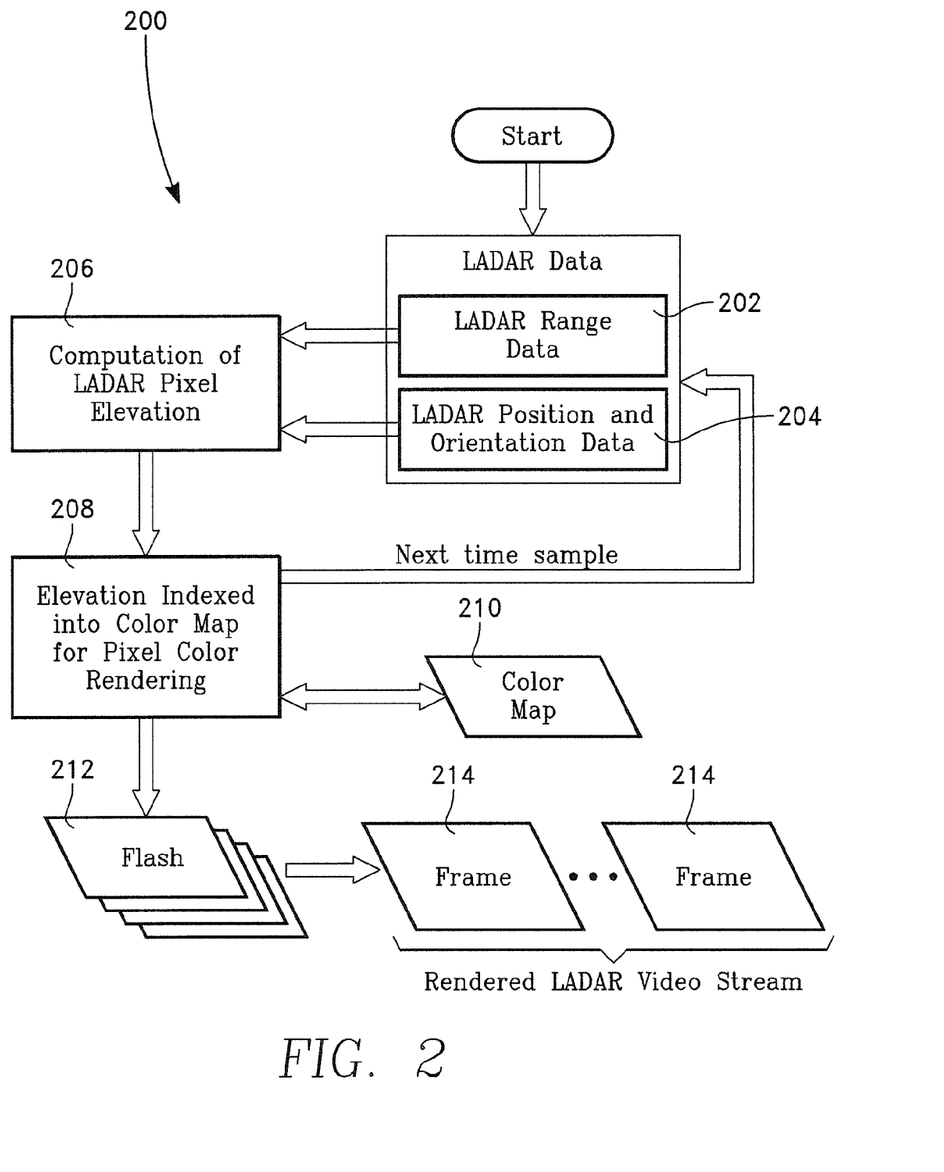
FIG. 2 is an exemplary block process diagram, according to some embodiments of the invention.
Figure 3:
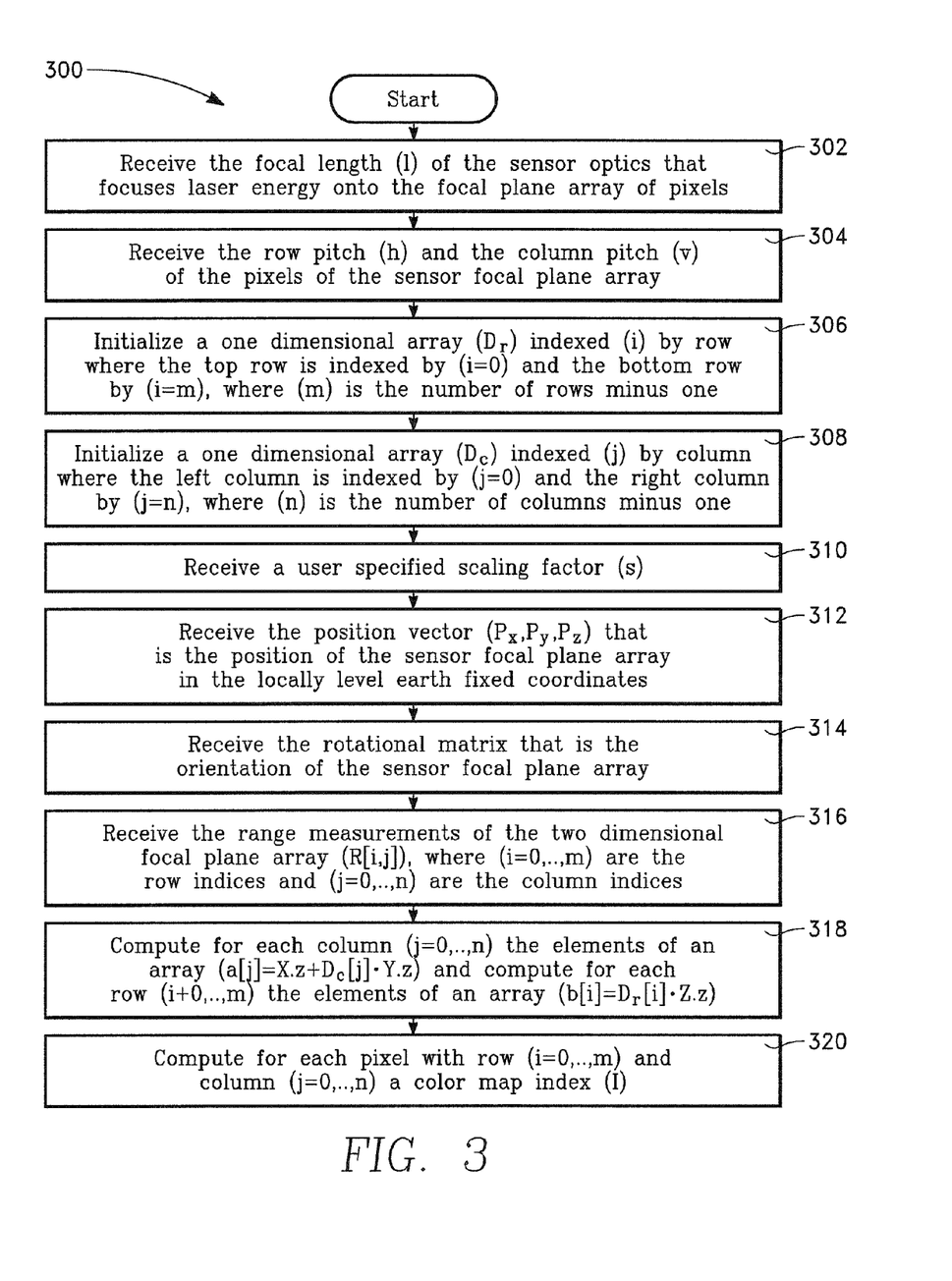
FIG. 3 is an exemplary flowchart, according to some embodiments of the invention.

FIGS. 2 & 3 are flowcharts/block process diagrams, according to some embodiments of the invention. In particular, the figures relate to LADAR range data video color rendering using a non-transitory computer readable medium. FIGS. 2 & 3 are equally applicable to method and article of manufacture embodiments.

FIG. 2 illustrates an overall block process diagram for some embodiments of the invention. FIG. 2 depicts how some embodiments of the invention work together to produce a rendered LADAR (RELADAR) video stream for purposes of visualization, processing, or other valuable processes. High-level processes are depicted as rectangles (see reference characters 202, 204, 206, and 208). Data structures are depicted as parallelograms (see reference characters 210, 212, and 214).

Embodiments depicted in FIG. 2 produce a LADAR range data as a colored rendered video stream. The LADAR sensor collects range data at time t (reference character 202) with a sensor Position and Orientation defined in an Earth Fixed three-dimensional space (reference character 204). Next, for each pixel of the Range Data, an approximate Elevation is computed (reference character 206) using the Position and Orientation, and also using a Direction Vector that specifies the look direction of a particular pixel with respect to the Sensor Fixed coordinate system. The Elevation is then converted into an Index for looking up a color value from the Color Map. The pixel is then set to the color value retrieved from the Color Map using the index derived from the Elevation for the pixel. The cycle is repeated with the next time sampled LADAR Range Data (reference characters 204, 208, 210, 212, and 214).

In FIG. 2, a method on an electronic processing device for LADAR range data video color rendering is depicted. The electronic processing device includes an electronic processor, a data storage device, and a graphical processing unit (GPU). LADAR range data at time (t) is collected with a LADAR sensor. In tasks 202 & 204, the LADAR range data is defined by position and orientation defined in an Earth-fixed (EF) three-dimensional space (shown in FIG. 4). The LADAR range data is the row (r) and column (c) range image. Each pixel notationally-defined as (r,c) and range is notationally-defined as ($R_{r,c}$) and is the distance from the LADAR sensor to a scene for the pixel (r,c).

The LADAR sensor is defined by a sensor fixed (SF) coordinate frame (shown in FIGS. 5A, 5B, & 5C) having its origin fixed to the LADAR sensor. The sensor fixed (SF) coordinate frame data is referenced by pixel. An elevation is electronically-computed for each pixel of the Range Data using the position and orientation associated with the Earth-fixed three dimensional space (task 206). The elevation is then electronically-converted into an index, I(r, c). A color value is electronically-determined for the pixel by extracting the color value associated with the index. The color map is stored on a data storage device (tasks 208 & 210).

Task 212 electronically-associates the color value with the pixel. The association is defined as a flash for the range data, the position data, and the orientation data collected at time (t). When two or greater flashes are present, the flashes are fit together to form a continuous image of the scene. The continuous image of the scene defines a frame. A time sequence of flashes defines a rendered LADAR video stream. The rendered LADAR video stream is output in a tangible medium (task 214). The tangible medium may include a visual display screen electronically-connected to the electronic processing device.

When additional LADAR range data exists, time is incremented to the next time (t+1). Tasks 202 through 212 are iterated through (the collecting LADAR range data task, the electronically-computing an elevation task, the electronically-converting the elevation into an index task, the electronically-determining a color value task, the electronically-associating the color value task, the fitting the flashes together task, and the outputting the rendered LADAR video stream task until no additional LADAR range data exists. Thus, the iteration occurs until all LADAR range data is analyzed.

In FIG. 4, the Earth-fixed (EF) coordinate frame is a three-dimensional Cartesian coordinate system, and is shown as reference character 400. Reference character 402 is the surface of the Earth. Reference character 404 is the Prime Meridian, representing a line of longitude. The equator is depicted as reference character 406. Reference characters 408, 410, and 412 depict the x, y, and z axes for the Earth-Centered, Earth-Fixed three-dimensional coordinate system, shown as $X_{ECEF}$, $Y_{ECEF}$, and $Z_{ECEF}$, respectively, and having its origin depicted as reference character 414.

The Earth-Fixed (EF) coordinate frame 400 has its x-y plane 416 lying parallel with the surface of the Earth 402 at its origin 424 (the origin of the x-y plane). The x-y plane 416 has its x-axis 418 pointing north, its y-axis 420 pointing east, and its z-axis 422 pointing down.

FIGS. 5A, 5B, & 5C depict an exemplary sensor-fixed (SF) coordinate frame in top, front, and side views, respectively. The sensor-fixed (SF) coordinate frame is a three-dimensional Cartesian coordinate system with its origin fixed to the LADAR sensor. Reference character 500 depicts each figure (FIGS. 5A, 5B, and 5C) in two-dimensional space, as a two-dimensional view plane of the LADAR sensor. In general, the x-axis 502 points in the forward looking direction of the LADAR sensor 500, the y-axis 504 is parallel with the LADAR sensor pixel rows, and the z-axis 506 is parallel with the LADAR sensor pixel columns.

As shown in FIG. 5A, the view plane 500 is shown in a top view, with the x and y-axes shown as reference characters 502 and 504, respectively. The x-axis 502 is perpendicular to the view plane 500, while the y-axis is parallel to the view plane. The z-axis (not seen in FIG. 5A) is into the page.

In FIG. 5B, the front view shows the two-dimensional view plane 500, divided into y and z coordinates, reference characters 504 and 506, respectively. The x-axis is perpendicular to the view plane 500 and is coming out of the page in the front view and therefore not shown in FIG. 5B. The y-axis 504 is parallel with the LADAR sensor rows of pixels and the z-axis 506 is parallel with the LADAR sensor pixel columns.

In FIG. 5C, the side view shows the two-dimensional view plan 500, divided into x and z coordinates, reference characters 502 and 506 respectively. The x-axis 502 is perpendicular to the view plane 500 and the z-axis 506 is parallel to the view plane. Reference character 508 shows the projection reference point of pixel chief rays 510.

The position data is notationally-defined as $(P_x, P_y, P_z)$ for the LADAR sensor at time (t) when said Range data was collected. The position data is defined in the sensor fixed coordinate frame with respect to the Earth fixed coordinate frame. When the position is ($P_x=0$, $P_y=0$, $P_z=0$), the origin of the sensor fixed coordinate frame is located at the origin of the Earth fixed coordinate frame. Thus, both coordinate frames of reference are initialized at the same point at the beginning.

The orientation data is a rotational matrix of the LADAR sensor and is notationally-defined as, $$M = \begin{bmatrix} T_{11} & T_{12} & T_{13} \\ T_{21} & T_{22} & T_{23} \\ T_{31} & T_{32} & T_{33} \end{bmatrix}.$$

The rotational matrix, M, is defined with respect to the Earth-fixed coordinate frame. Each element of the matrix, M, is defined by T and is defined for the sensor fixed coordinate frame as an orientation, such that $T_{11}, \ldots, T_{33}$ are the elements of the matrix. The rotational matrix, M, has an identity matrix of $$\begin{bmatrix} 1 & 0 & 0 \\ 0 & 1 & 0 \\ 0 & 0 & 1 \end{bmatrix},$$

for the elements T defined for the SF coordinate frame as a reference orientation. The x-axis of both the Earth-fixed coordinate frame and the sensor-fixed coordinate frame are parallel and pointing in the same direction. The y-axis of both the Earth-fixed coordinate frame and the sensor-fixed coordinate frame are parallel and pointing in the same direction. The z-axis of both the Earth-fixed coordinate frame and the sensor-fixed coordinate frame are parallel.

The first column of the rotation matrix is the x-axis of the SF coordinate frame expressed as a unit vector in Earth-fixed coordinates. The second column of the rotational matrix is the y-axis of the sensor-fixed coordinate frame. The third column of the rotational matrix is the z-axis of the sensor fixed coordinate frame.

The elements of the first row of the rotational matrix are the x-coordinates for each of the sensor-fixed coordinate system axes. The elements of the second row of the rotational matrix are the y-axis coordinates for each of the sensor-fixed coordinate system axes. The elements of the third row are the z-axis coordinates for each of the sensor-fixed coordinate system axes.

In tasks 208 & 210, the computing of the elevation task is an electronic calculation of the Earth-fixed vertical (z-axis) coordinate value for each pixel using the orientation data. The elevation is mathematically-defined as $E_{r,c} = (T_{31} + D_c T_{32} + D_r T_{33})R_{r,c} + P_z$. The converting of the elevation into the index, $I_{r,c}$, is the remainder of the elevation, $E_{r,c}$, scaled by a scaling factor, s, divided by the number of elements, n, in the color map. The number of elements, n, is typically 256. The result is mathematically-defined as $I_{r,c} = (s \cdot E_{r,c})$ modulo(n).

Referring to FIG. 3, yet another embodiment of the invention is depicted for LADAR range data video color rendering on an electronic processing device. A LADAR sensor having sensor optics is provided and a focal length (l) of the sensor optics that focuses laser energy onto a focal plane array of pixels is provided (task 302). A row pitch (h) and the column pitch (v) of the pixels of the sensor focal plane array is received and input into the computer (task 304). For the reader, all receiving tasks discussed herein means that data is supplied to the described processing tasks as an input. The data can be received by the LADAR sensor, a simulation, or another technique, and then input into the computer, without detracting from the generalities of embodiments of the invention.

Task 306 electronically-initializes a one dimensional array, $(D_r)$. The one-dimensional array, $(D_r)$, has a top row and a bottom row and is indexed (i) by row where the top row is indexed by (i=0) and the bottom row by (i=m). In this relationship, (m) is the number of rows minus one. The one-dimensional array, ($D_r$), is mathematically-defined as $$D_r[i] = \left(i - \frac{m}{2}\right)\left(\frac{h}{l}\right).$$

In task 308, a one dimensional array, ($D_c$), is electronically-initialized. The one dimensional array, ($D_c$), has a left-most column and a right-most column. The one-dimensional array, ($D_c$), is indexed (j) by column where the left column is indexed by (j=0) and the right column by (j=n). In this relationship, (n) is the number of columns minus one. The one-dimensional array, ($D_c$), is mathematically-defined as $$D_c[j] = \left(j - \frac{n}{2}\right)\left(\frac{v}{l}\right).$$

In task 310, a user specified scaling factor, (s), is received. The user scaling factor, (s), allows user control over the rate of the conversion from elevation to color, the result of which helps the user to quickly understand the actual elevation dimensions. A position vector is received in task 312. The Position vector is represented as ($P_x$, $P_y$, $P_z$) and corresponds to the position of the sensor focal plane array in locally level Earth fixed coordinate frame.

In task 314, a rotation matrix is received. The rotation matrix is notationally-defined as $$M = \begin{bmatrix} X \cdot x & Y \cdot x & Z \cdot x \\ X \cdot y & Y \cdot y & Z \cdot y \\ X \cdot z & Y \cdot z & Z \cdot z \end{bmatrix}$$

and is an orientation of the sensor focal plane array in the locally level earth fixed coordinate frame. The rotation matrix has first, second, and third columns, as well as first, second, and third rows. The first column of the rotation matrix is a unit vector that points in the look direction of the focal plane array defined by the x-axis of the focal plane array coordinate frame. The second column of the rotation matrix is a unit vector that is parallel to the rows of the focal plane array and points to the right when faced in the look direction of the focal plane array, defined by the y-axis of the focal plane array coordinate frame. The rotational matrix, M, has an identity matrix of $$\begin{bmatrix} 1 & 0 & 0 \\ 0 & 1 & 0 \\ 0 & 0 & 1 \end{bmatrix}.$$

The third column of said rotation matrix is a unit vector that is parallel to the columns of the focal plane array and points down defined by the z-axis of the focal plane array coordinate frame. The focal plan array coordinate frame is another term to describe the sensor-fixed (SF) coordinate frame. The elements of the first row of the rotation matrix are the x-axis coordinates in the locally level earth fixed coordinate frame. The elements of the second row of the rotation matrix are the y-axis coordinates in the locally level earth fixed coordinate frame. The elements of the second row of the rotation matrix are the z-axis coordinates in the locally-level Earth fixed coordinate frame.

In task 316, range measurements of the two-dimensional focal plane array (R[i, j]) are received, where (i=0, ..., m) are the row indices and (j=0, ..., n) are the column indices. Task 318 electronically-computes for each column (j=0, ..., n) the elements of an array (a[j]=X.z+$D_c$[j]·Y.z) and electronically-computes for each row (i=0, ..., m) the elements of an array (b[i]=$D_r$[i]·Z.z). A color map index (I) is electronically-computed for each pixel with row (i=0, ..., m) and column (j=0, ... n). The color map has a length that is mathematically defined as (length=g+1=$2^k$), with k generally an integer value of 8.0 (task 320), and g is the highest index of the (zero based) color map. When two or greater flashes are present, the flashes are fit together to form a continuous image of a scene. The continuous image of the scene defines a frame and a time sequence of frames define a rendered LADAR video stream. The rendered LADAR video stream is output in a tangible medium, which includes a visual display screen.

The tangible medium is a visual display screen. It should be noted, also, that the rendered LADAR video stream can also be transmitted to systems configured to use the output. As such, in the embodiments, output maybe be shown and/or represented as a visual display screen depiction, hard copy printouts, as well as other media using classification/matching information such as, for example, a computer having computer-readable instructions that is configured to use output from embodiments of the invention.

While this technology is primarily described using LADAR, other energy sensor systems such as RADAR, SONAR, and LIDAR can also be simulated using this technology. OpenGL is a software interface to computer graphics hardware and can be used for rendering.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method on an electronic processing device for LADAR range data video color rendering, the electronic processing device comprising an electronic processor, a data storage device, and a graphical processing unit, the method comprising:

providing an electronic processing device;

collecting LADAR range data at time (t) with a LADAR sensor operatively-associated with said electronic processing device, wherein said range data is defined by position and orientation defined in an Earth-fixed (EF) three-dimensional space;

wherein said range data is the row (r) and column (c) range image, wherein for each pixel notationally-defined as (r,c), a range notationally-defined as ($R_{r,c}$) is the distance from said LADAR sensor to a scene for the pixel (r,c);

wherein said EF three-dimensional space is an EF coordinate frame and is a three-dimensional Cartesian coordinate system having an origin fixed at a point near the surface of the earth, wherein the x-axis points north, the y-axis points east, and the z-axis points down, wherein the x-y plane is parallel with the surface of the earth at the origin;

wherein said LADAR sensor is defined by a sensor-fixed (SF) coordinate frame having its origin fixed to said LADAR sensor, wherein said SF coordinate frame is a three-dimensional Cartesian coordinate system having an origin fixed to said LADAR sensor, wherein the x-axis points in the forward looking direction of said LADAR sensor, the y-axis is parallel with said LADAR sensor pixel rows, and the z-axis is parallel with said LADAR sensor pixel columns;

electronically-computing an elevation for each pixel of said Range Data using said position and orientation associated with said EF three-dimensional space;

electronically-converting said elevation into an index, l(r, c);

electronically-determining a color value for said pixel by extracting, from a color map stored on a data storage device, the color value associated with said index;

electronically-associating said color value with said pixel, said association defined as a flash for said range data, said position, and said orientation collected at time (t);

wherein said position is position notationally-defined as $(P_r, P_y, P_z)$ of said LADAR sensor at time (t) when said Range data was collected, wherein said position is defined in said sensor fixed coordinate frame with respect to said EF coordinate frame, wherein when said position is $(P_x=0, P_y=0, P_z=0)$, the origin of said sensor fixed coordinate frame is located at the origin of said EF coordinate frame;

wherein said orientation is a rotational matrix of said LADAR sensor notationally-defined defined as, $$M = \begin{bmatrix} T_{11} & T_{12} & T_{13} \\ T_{21} & T_{22} & T_{23} \\ T_{31} & T_{32} & T_{33} \end{bmatrix},$$

said rotational matrix, M, is defined with respect to said EF coordinate frame, wherein said rotational matrix, M, has an identity matrix of $$\begin{bmatrix} 1 & 0 & 0 \\ 0 & 1 & 0 \\ 0 & 0 & 1 \end{bmatrix},$$

for the elements T defined for said SF coordinate frame as a reference orientation where the x-axis of both the EF coordinate frame and the SF coordinate frame are parallel and pointing J in the same direction, wherein said y-axis of both the EF coordinate frame and the SF coordinate frame are parallel and pointing in the same direction, wherein the z-axis of both the EF coordinate frame and the SF coordinate frame are parallel;

wherein when two or greater flashes are present, fitting said flashes together to form a continuous image of said scene, said continuous image of said scene defining a frame, wherein a time sequence of frames define a rendered LADAR video stream; and outputting said rendered LADAR video stream in a tangible medium.

2. The method according to claim 1, wherein when additional LADAR range data exists, incrementing to next time (t+1) and iterating through each of said collecting LADAR range data task, said electronically-computing an elevation task, said electronically-converting said elevation into an index task, said electronically-determining a color value task, said electronically-associated said color value task, said fitting said flashes together task, and said outputting said rendered LADAR video stream task until no additional LADAR range data exists.

3. The method according to claim 1, further comprising displaying said rendered LADAR video stream on a visual display device associated with said electronic processing device.

4. The method according to claim 1, wherein the first column of said rotational matrix is the x-axis of the SF coordinate frame expressed as a unit vector in EF coordinates, wherein the second column of said rotational matrix is the y-axis of the SF coordinate frame, wherein the third column of said rotational matrix is the z-axis of the SF coordinate frame.

5. The method according to claim 1, wherein the elements of the first row of said rotational matrix are the x-axis coordinates for each of the SF coordinate system axes, wherein the elements of the second row of said rotational matrix are the y-axis coordinates for each of the SF coordinate system axes, wherein the elements of the third row are the z-axis coordinates for each of the SF coordinate system axes.

6. The method according to claim 1, further comprising:
wherein said computing said elevation task is an electronic approximation of said EF vertical (z-axis) coordinate value for each pixel using said orientation, wherein said elevation is mathematically-defined in terms of look angles of said LADAR sensor, said elevation, $E_{r,c} = (T_{31} + D_c\ T_{32} + D_r\ T_{33})\ R_{r,c} + P_z$;

where $D_c$ is the look angle in radians of said LADAR sensor in the SF coordinate frame, y-axis direction, with rotation about the z-axis;

where $D_r$ is the look angle in radians of said LADAR sensor in the SF coordinate frame, z-axis direction, with rotation about the y-axis;

wherein said converting said elevation into said index, $I_{r,c}$, is the remainder of said elevation, $E_{r,c}$, scaled by a scaling factor, s, divided by the number of elements, n, in said color map, said index is mathematically-defined as $I_{r,c} = (s \cdot E_{r,c}) \bmod(n)$.

7. A method on an electronic processing device for LADAR range data video color rendering, the electronic processing device comprising an electronic processor, a data storage device, and a graphical processing unit, the method, comprising:

providing a LADAR sensor having sensor optics and receiving a focal length (l) of said sensor optics that focuses laser energy onto a focal plane array of pixels;

receiving a row pitch (h) and the column pitch (v) of the pixels of a sensor focal plane array;

electronically-initializing a one dimensional array, $(D_r)$, having a top row and a bottom row, said one dimensional array, $(D_r)$, indexed (i) by row where the top row is indexed by (i=0) and the bottom row by (i=m), where (m) is the number of rows minus one, wherein said one dimensional array, $(D_r)$, is mathematically-defined as $$D_r[i] = \left(i - \frac{m}{2}\right)\left(\frac{h}{l}\right);$$

electronically-initializing a one dimensional array, $(D_c)$, having a left-most column and a right-most column, said one dimensional array, $(D_c)$, indexed (j) by column where the left column is indexed by (j=0) and the right column by (j=n), where (n) is the number of columns minus one, wherein said one dimension array, ($D_c$), is mathematically-defined as $$D_c[j] = \left(j - \frac{n}{2}\right)\left(\frac{v}{l}\right);$$

receiving a user specified scaling factor, (s);
receiving a position vector, ($P_x$, $P_y$, $P_z$), corresponding to the position of the sensor focal plane array in a locally-level earth-fixed (EF) coordinate frame;
receiving a rotation matrix notationally-defined as $$M = \begin{bmatrix} X \cdot x & Y \cdot x & Z \cdot x \\ X \cdot y & Y \cdot y & Z \cdot y \\ X \cdot z & Y \cdot z & Z \cdot z \end{bmatrix}$$

that is an orientation of the sensor focal plane array in the locally-level earth-fixed (EF) coordinate frame, said rotation matrix having first, second, and third columns, and first, second, and third rows;
wherein said first column of said rotation matrix is a unit vector that points in the look direction of the focal plane array defined by the x-axis of the focal plane array coordinate frame;
wherein said second column of said rotation matrix is a unit vector that is parallel to the rows of the focal plane array and points to the right when faced in the look direction of the focal plane array defined by the y-axis of the focal plane array coordinate frame;
wherein said third column of said rotation matrix is a unit vector that is parallel to the columns of the focal plane array and points down defined by the z-axis of the focal plane array coordinate frame;
wherein the elements of the first row of said rotation matrix are the x-axis coordinates in the locally-level earth-fixed coordinate frame;
wherein the elements of the second row of said rotation matrix are the y-axis coordinates in the locally-level earth-fixed coordinate frame;
wherein the elements of the second row of said rotation matrix are the z-axis coordinates in the locally-level earth-fixed coordinate frame;
receiving range measurements of the two-dimensional focal plane array (R[i, j]), where (i=0, ..., m) are the row indices and (j=0, ..., n) are the column indices;
electronically-computing for each column (j=0, ..., n) the elements of an array (a[j]=X.z+$D_c$[j]·Y.z) and electronically-computing for each row (i=0, ..., m) the elements of an array (b[i]=$D_r$[i]·Z.z);
and electronically-computing for each pixel with row (i=0, ..., m) and column (j=0, ... n) a color map index (I);
wherein the color map having a length mathematically defined as (length=g+1=$2^k$), where g is the largest index of said color map;
wherein when two or greater flashes are present, fitting said flashes together to form a continuous image of a scene, said continuous image of said scene defining a frame, wherein a time sequence of frames define a rendered LADAR video stream; and
outputting said rendered LADAR video stream in a tangible medium.

8. The method according to claim 7, wherein said tangible medium is a visual display screen.

9. The method according to claim 7, wherein k=8.0.

10. A non-transitory computer readable medium having stored thereon a plurality of computer executable instructions for LADAR range data video color rendering a LADAR sensor electronically-associated with a navigation unit, wherein said navigation unit is configured to communicate with a central processing unit (CPU) and graphics processing unit (GPU) associated with an electronic processing device, wherein when executed by a computer including said GPU, causes the computer to:
receive a row pitch (h) and column pitch (v) of pixels of a sensor focal plane array from a LADAR sensor having sensor optics, and receive a focal length (l) of said sensor optics that focuses laser energy onto a focal plane array of pixels;
initialize a one dimensional array, ($D_r$), having a top row and a bottom row, said one dimensional array, ($D_r$), indexed (i) by row where the top row is indexed by (i=0) and the bottom row by (i=m), where (m) is the number of rows minus one, wherein said one dimensional array, ($D_r$), is mathematically-defined as $$D_r[i] = \left(i - \frac{m}{2}\right)\left(\frac{h}{l}\right);$$

initialize a one dimensional array, ($D_c$), having a left-most column and a right-most column, said one dimensional array, ($D_c$), indexed (j) by column where the left column is indexed by (j=0) and the right column by (j=n), where (n) is the number of columns minus one, wherein said one dimension array, ($D_c$), is mathematically-defined as $$D_c[j] = \left(j - \frac{n}{2}\right)\left(\frac{v}{l}\right);$$

receive a user specified scaling factor, (s);
receive a position vector, ($P_x$, $P_y$, $P_z$), corresponding to the position of the sensor focal plane array in a locally-level earth-fixed coordinate frame;
receive a rotation matrix notationally-defined as $$M = \begin{bmatrix} X \cdot x & Y \cdot x & Z \cdot x \\ X \cdot y & Y \cdot y & Z \cdot y \\ X \cdot z & Y \cdot z & Z \cdot z \end{bmatrix}$$

that is an orientation of the sensor focal plane array in the locally-level earth-fixed coordinate frame, said rotation matrix having first, second, and third columns, and first, second, and third rows;
wherein said first column of said rotation matrix is a unit vector that points in the look direction of the focal plane array defined by the x-axis of the focal plane array coordinate frame;
wherein said second column of said rotation matrix is a unit vector that is parallel to the rows of the focal plane array and points to the right when faced in the look direction of the focal plane array defined by the y-axis of the focal plane array coordinate frame;

wherein said third column of said rotation matrix is a unit vector that is parallel to the columns of the focal plane array and points down defined by the z-axis of the focal plane array coordinate frame;

wherein the elements of the first row of said rotation matrix are the x-axis coordinates in the locally-level earth-fixed coordinate frame;

wherein the elements of the second row of said rotation matrix are the y-axis coordinates in the locally-level earth-fixed coordinate frame;

wherein the elements of the second row of said rotation matrix are the z-axis coordinates in the locally-level earth-fixed coordinate frame;

receive range measurements of the two-dimensional focal plane array (R[i,j]), where (i=0, ..., m) are the row indices and (j=0, ..., n) are the column indices;

compute for each column (j=0, ..., n) the elements of an array (a[j]=X.z+$D_c$[j]·Y.z) and electronically-computing for each row (i=0, ..., m) the elements of an array (b[i]=$D_r$[i]·Z.z);

compute for each pixel with row (i=0, ..., m) and column (j=0, ... n) a color map index (I);

wherein the color map having a length mathematically defined as (length=g+1=$2^k$), where g is the largest index of said color map;

wherein when two or greater flashes are present, fit said flashes together to form a continuous image of a scene, said continuous image of said scene defining a frame, wherein a time sequence of frames define a rendered LADAR video stream; and output said rendered LADAR video stream in a tangible medium.

11. The non-transitory computer readable medium according to claim 10, wherein said tangible medium is a visual display screen.

12. The non-transitory computer readable medium according to claim 10, wherein k=8.0.

* * * * *